United States Patent [19]
Milch

[11] Patent Number: 5,352,879
[45] Date of Patent: Oct. 4, 1994

[54] DX BAR CODE READER

[75] Inventor: James R. Milch, Pittsford, N.Y.

[73] Assignee: Eastman Kodak Company, Rochester, N.Y.

[21] Appl. No.: 876,311

[22] Filed: Apr. 30, 1992

[51] Int. Cl.$^5$ .................................................. G06K 7/10
[52] U.S. Cl. .................................................. 235/466
[58] Field of Search .................... 235/455, 466; 250/214 AL, 214 B

[56] References Cited

U.S. PATENT DOCUMENTS

| | | | |
|---|---|---|---|
| 4,172,554 | 10/1979 | Clariaval et al. | 235/466 |
| 4,177,377 | 12/1979 | Kuze | 235/466 |
| 4,315,245 | 2/1982 | Nabahara et al. | 235/455 |
| 4,603,976 | 8/1986 | Fetzer et al. | 235/455 |
| 4,818,847 | 4/1989 | Hara et al. | 235/472 |
| 4,961,086 | 10/1990 | Takemaka | 235/462 |
| 4,983,817 | 1/1991 | Dolash et al. | 235/455 |
| 5,122,645 | 6/1992 | Saeki et al. | 235/375 |
| 5,128,519 | 7/1992 | Tokuda | 235/375 |
| 5,164,574 | 11/1992 | Ujie et al. | 235/466 |
| 5,179,266 | 1/1993 | Imamura | 235/375 |
| 5,212,367 | 5/1993 | Takenaka | 235/375 |

FOREIGN PATENT DOCUMENTS

| | | |
|---|---|---|
| 0331048 | 9/1989 | European Pat. Off. |
| 60-178440 | 9/1985 | Japan |
| 1-219730 | 9/1989 | Japan |

Primary Examiner—Tony M. Argenbright
Assistant Examiner—Erick Solis
Attorney, Agent, or Firm—David M. Woods

[57] ABSTRACT

The invention provides an inexpensive and compact bar code reader that is capable of reading separate clock and data tracks of a DX bar code without the use of custom optical devices or optical projection. The bar code reader includes first and second light sources, a photodetector device that generates an output signal proportional to the amount of light directed to the photodetector device from the first and second light sources, an analog-to-digital converter that samples the output signal of the photodetector device to generate digital data signals, and a control processor that controls the operation of the first and second light sources.

9 Claims, 5 Drawing Sheets

DX BAR CODE READER

BACKGROUND

The invention relates generally to devices that read optically encoded information. More specifically, the invention relates to a device for reading optically encoded information from the edge of a strip of photographic film.

Many photographic films are identified by an optical bar code that is part of an industry standard "DX" film identification system. The DX coding includes information related to the film sensitivity and is printed in the form of a latent image on an edge of a negative film. The DX bar code includes a clock track and a data track, both of which must be read and correlated in order to decode the information contained therein.

There are a number of difficulties associated with attempting to design a simple and inexpensive DX bar code reader. For example, standard optical devices are larger than the track spacing of the clock and data tracks, the optical density of the "on" and "off" regions of the tracks varies among film types and film treatment, the pitch of the code varies among film types, the position of the code with respect to the edge of the film varies, and the film must be read while it is moving through a film gate assembly. The above difficulties have resulted in bulky and expensive readers that generally require the use of custom optical devices and/or optical projection to separate the tracks and capture the encoded information.

In view of the above, it is an object of the present invention to provide an inexpensive and compact bar code reader that does not require custom optical devices or optical projection to separate the clock and data tracks of a DX bar code.

SUMMARY

The invention provides an inexpensive and compact bar code reader that is capable of reading separate clock and data tracks of a DX bar code without the use of custom optical devices or optical projection. The bar code reader includes first and second light sources, a photodetector device that generates an output signal proportional to the amount of light directed to the photodetector device from the first and second light sources, an analog-to-digital converter that samples the output signal of the photodetector device to generate digital data signals, and a control processor that controls the operation of the first and second light sources. In operation, the first light source is activated to illuminate a first portion of a bar code to be decoded. Light from the first light source passes through the bar code and is directed onto a photodetector. The photodetector generates a first signal that is representative of the amount of light received by the photodetector from the first light source. The first signal is supplied to an analog-to-digital converter that converts the first signal into digital data. The first light source is then deactivated and the second light is activated to illuminate a second portion of the bar code. A second signal representative of the amount of light that is transmitted through the bar code is then generated by the photodetector. The second signal is then converted into digital sample data by the analog-to-digital converter. A dark reading is also preferably obtained with both of the light sources deactivated. The dark reading is subtracted from the readings obtained from the first and second signal in order to compensate for offsets and drift.

BRIEF DESCRIPTION OF THE DRAWINGS

With the above as background, reference should now be made to the accompanying description of the best modes of practicing the invention and the accompanying figures, wherein.

MODES OF CARRYING OUT THE INVENTION

Figure 1:
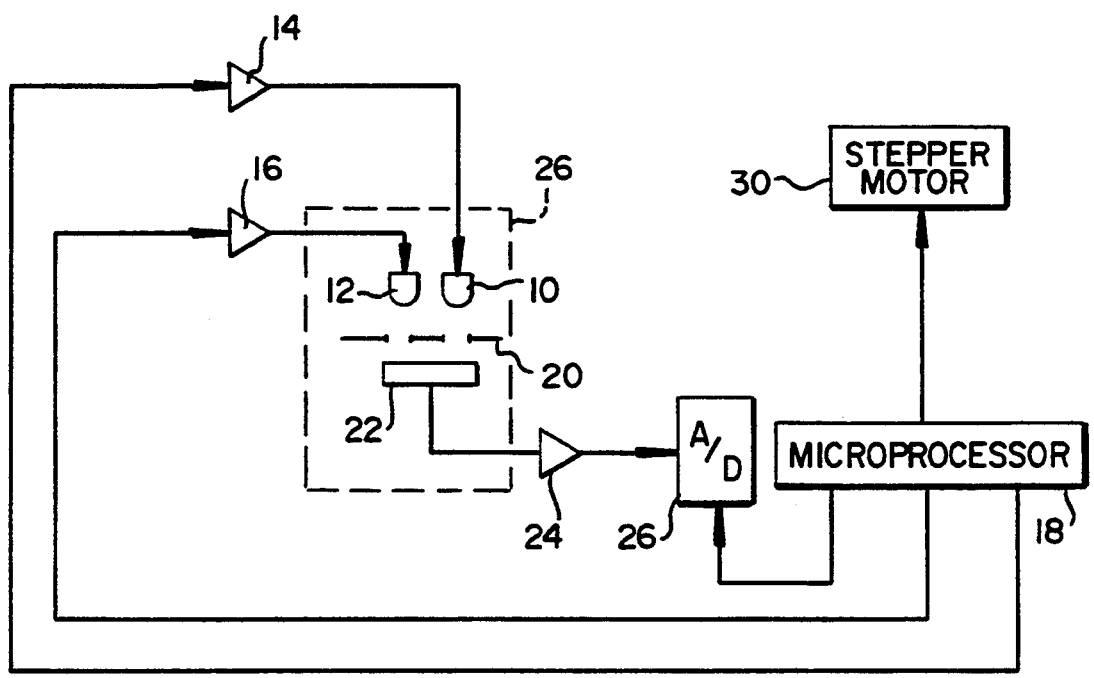
FIG. 1 is a basic schematic diagram of a DX bar code reader in accordance with the present invention.

A basic schematic diagram of a DX bar code reader in accordance with the invention is illustrated in FIG. 1. The reader includes two light emitting diodes (LEDs) 10, 12, coupled to corresponding drivers 14, 16, which in turn are controlled by a microprocessor 18. The LEDs 10, 12 are located above an aperture plate 20 having two pin-holes located therein. A single photodetector device 22 is located below the aperture plate 20 and generates a signal in response to light passing through either of the pin-holes located in the aperture plate 20. The output signal from the photodetector device 22 is supplied to an amplifier 24, which in turn is coupled to an analog-to-digital (A/D) converter 26. Operation of the A/D converter 26 is controlled by the microprocessor 18. The LEDs 10, 12, the aperture plate 20 and the photodetector device 22 are located in a film gate 26 (illustrated in phantom) through which a DX encoded film is driven by a drive system including a stepper motor 30 under control of the microprocessor 18. The film gate 26 positions the film such that the clock and data tracks of the DX code are located above the pin-holes in the aperture plate 20.

During operation, the film is moved through the film gate 26 one step at a time by the stepper motor 30. The microprocessor 18 preferably activates the A/D converter 26 to sample the output of the photodetector device 22 with both of the LEDs 10, 12 turned off. The first LED 10 is then turned on by the microprocessor 18, and the light from the first LED 10 that passes through the film and the pin-hole in the aperture plate is measured by the photodetector 22, while the A/D converter 26 samples the output of the photodetector 22 and supplies the result to the microprocessor 18. The first LED 10 is then turned off and the second LED 12 is turned on. Light from the second LED 12 that passes through the film and the pin-hole in the aperture plate is then measured by the photodetector 22 while the A/D converter 26 samples the output of the photodetector 22. The microprocessor 18 then subtracts the dark reading from the readings obtained during the activation of the first and second LEDs 10, 12 in order to compensate for offsets and drift. The stepper motor 30 is then activated by the microprocessor 18 to advance the film in the film gate 26 and the measurement process is repeated. The readings produced during the measurement process are stored in the microprocessor memory and may be processed either concurrently with data acquisition or after all the data has been acquired.

Figure 2:
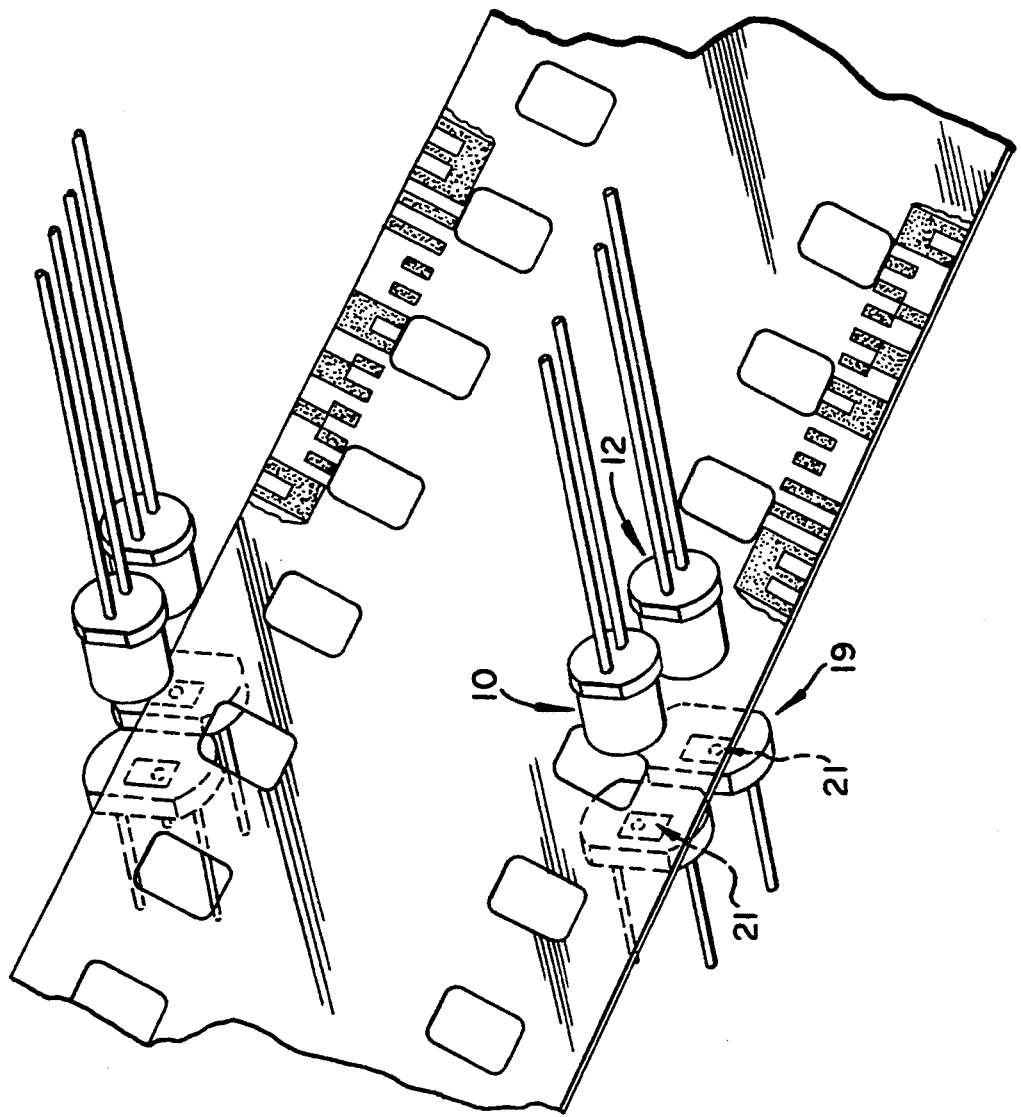
FIG. 2 illustrates the location of the LEDs and photodetector device of the bar code reader illustrated in FIG. 1 with respect to film located in a film gate.

The reader can be constructed using standard photodetector and LED components and also does not require additional optical elements. As shown in FIG. 2, for example, standard LEDs (MarkTech MT85F-UR) are utilized for the LEDs 10, 12 and two standard photodiodes 19 (Hamamatsu S1133-01) wired in parallel to generate a single output are utilized for the photodetector device 22. It should be noted that, in the illustrated embodiment, the apertures 21 of the photodiodes 19 are offset in the in-track direction of the film and the clock and data tracks of the DX code are therefore not read at the same point. This is not a problem, however, as the microprocessor can easily reconstruct the signal at the same film position from measurements made at different times, as the exact position of the film is always known due to the use of the stepping motor 30 to move the film through the gate in specific increments.

Figure 3:
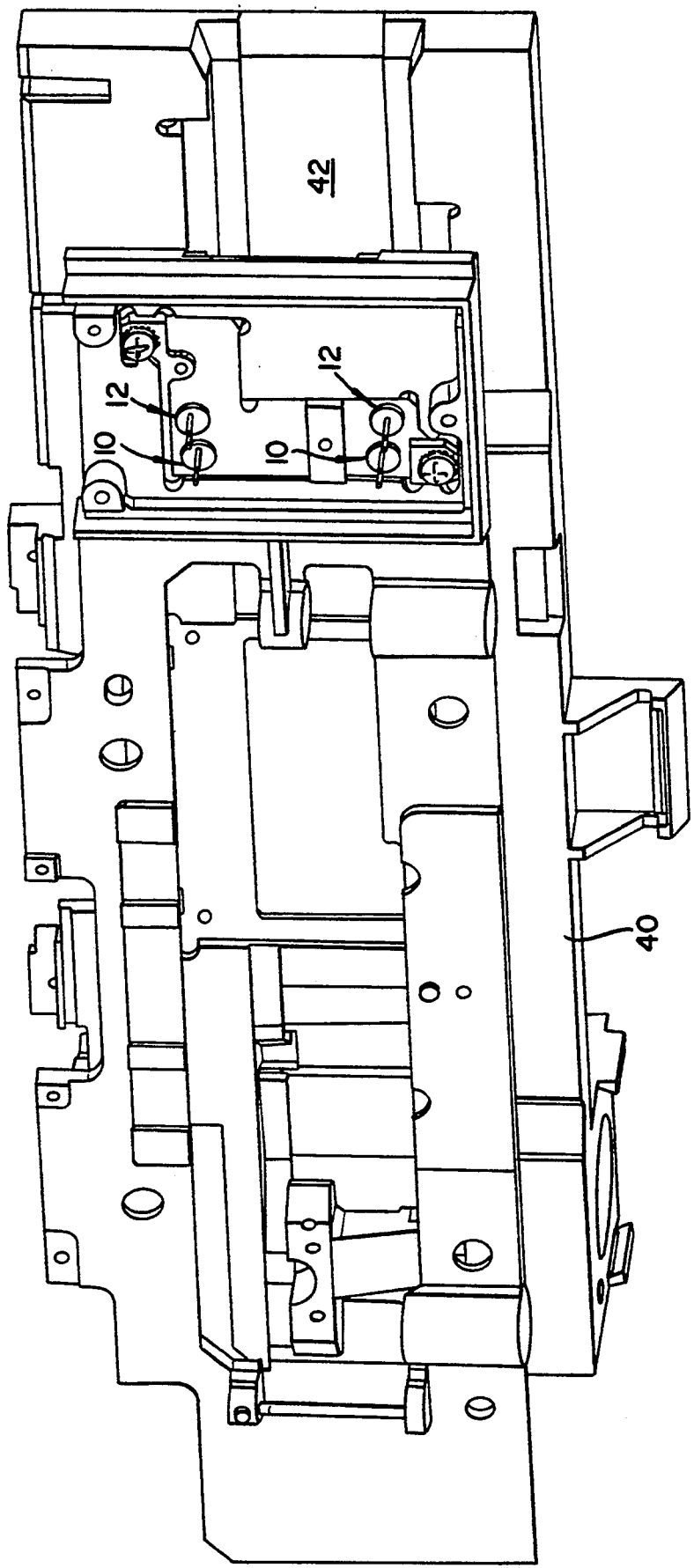
FIG. 3 illustrates a top view of a film gate assembly incorporating a dual system in accordance with the present invention.
Figure 4:
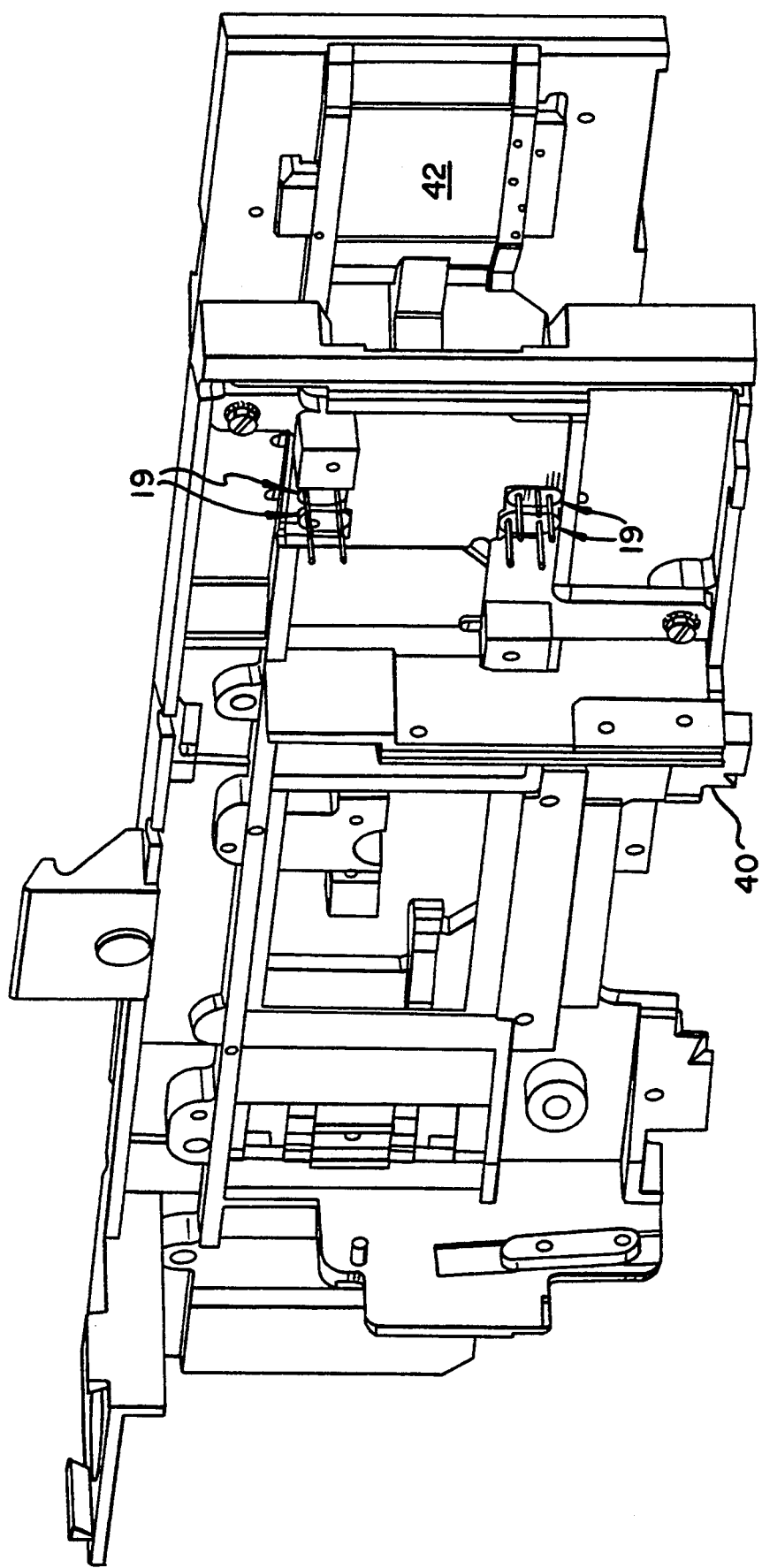
FIG. 4 illustrates a bottom view of a film gate assembly incorporating a dual system in accordance with the present invention.

FIG. 2 also illustrates the use of LEDs and photodiodes on both sides of the film. It is desirable to locate detectors on both sides of the film as some manufacturers include DX coding on both edges. In addition, the use of a "dual system" also makes it feasible to detect when film is improperly inserted in the film gate. FIG. 3 is a top view of a film gate assembly 40 illustrating the placement of the LEDs 10, 12 in a dual system above a film path 42 of the film gate assembly 40 and FIG. 4 is a bottom view of the film gate assembly 40 illustrating the placement of the photodiodes 19 below the film path 42.

Figure 5:
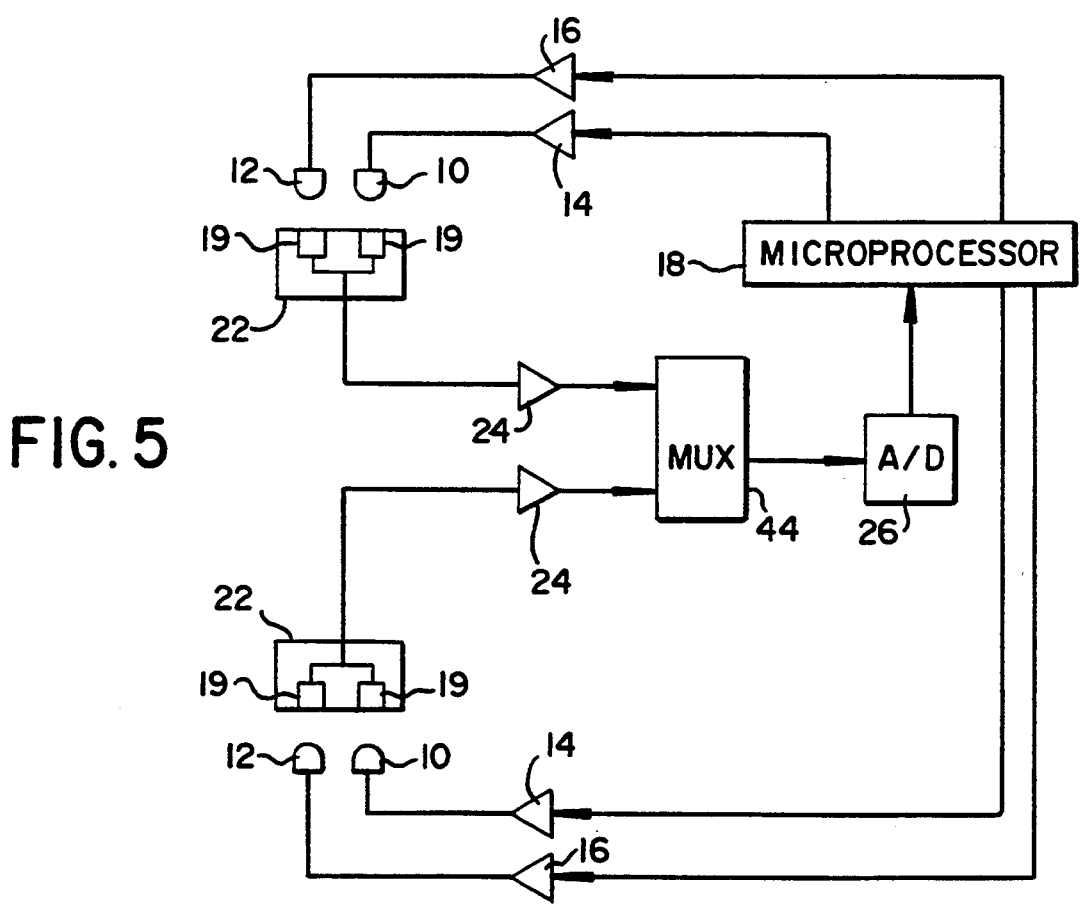
FIG. 5 is a basic electrical schematic diagram of a first embodiment of a dual system DX bar code reader in accordance with the present invention.
Figure 6:
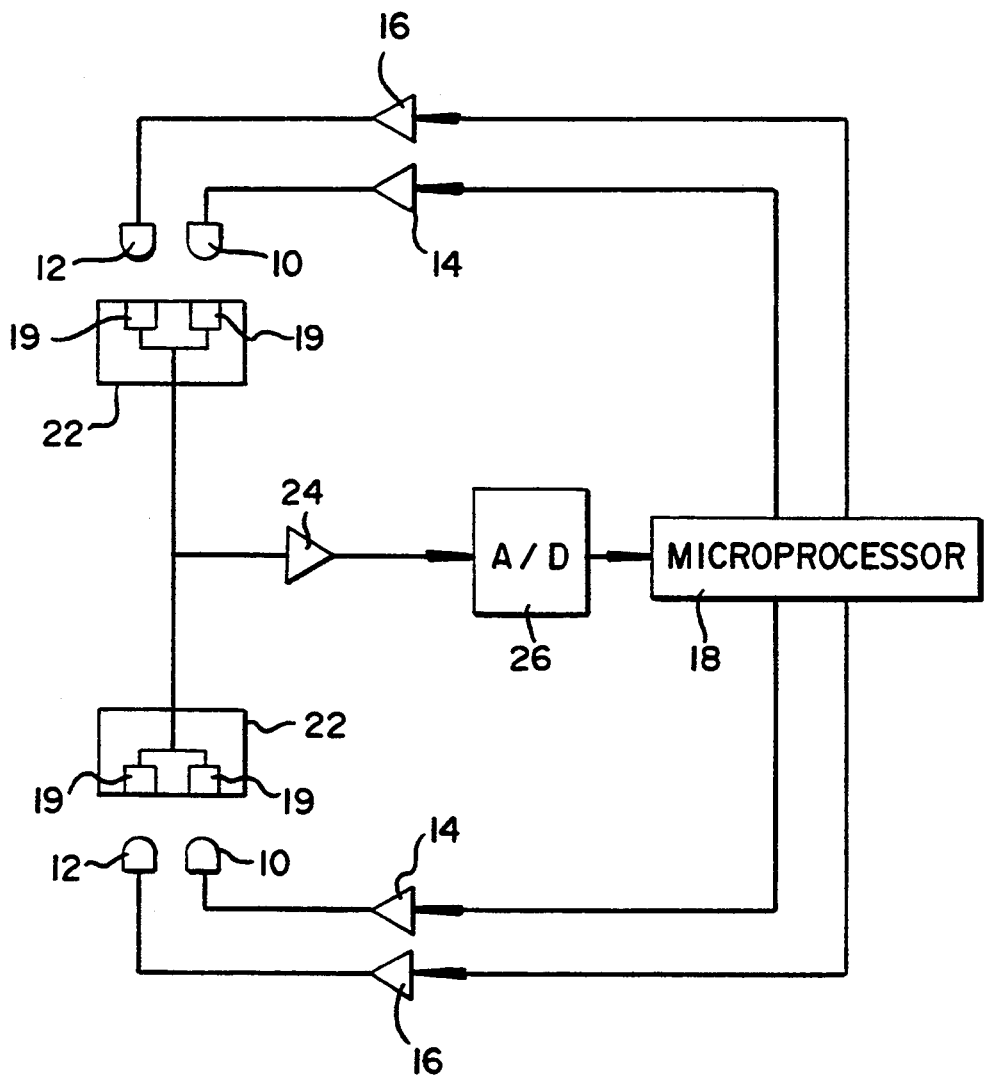
FIG. 6 is a basic electrical schematic diagram of a second embodiment of a dual system DX bar code reader in accordance with the present invention.

FIG. 5 illustrates an electrical schematic diagram of one dual system embodiment in which a multiplexer (MUX) 44 is used to supply the output signals from the photodetectors 22 on each of the two sides in an alternating manner to the A/D converter 26. In the embodiment illustrated in FIG. 6, the output of the photodetectors 22 are coupled together, but the operation of the LEDs 10, 12 is pulsed back and forth from side to side.

The invention provides many advantages over conventional bar code readers including the use of a single read channel to read both the clock and data tracks of the DX code, the use of standard parts that do not require additional optics, and a read time of between 10–100 microseconds which permits the LEDs to be off most of the time. The low duty cycle allows the LEDs to be driven at higher currents, without causing overheating or a shortening of their operation life, than would be possible if they were constantly activated. The higher LED current produces more light and therefore a larger signal at the photodetector.

INDUSTRIAL UTILITY

The invention is particularly useful in providing an inexpensive and compact barcode reader for reading DX barcode data from photographic film as it passes through a film gate in a film processor or film scanner. The barcode reader of the invention, however, can be utilized to other types of devices to read other types of barcodes.

The invention has been described with reference to certain preferred embodiments thereof. It will be understood, however, that modifications and variations are possible within the scope of the appended claims. For example, the invention is not limited to reading transmissive type bar codes, wherein light is passed through the bar code before it strikes the photodetector, but can be employed in reflective type bar code readers, wherein light is reflected off the bar code to the photodetector.

What is claimed:

1. A barcode reader comprising: first and second light sources; a photodetector device that generates an output signal proportional to the amount of light directed to the photodetector device from the first and second light sources; means for sampling the output signal of the photodetector device to generate digital data signals; and control means for selectively controlling the operation of the first and second light sources in synchronism with said sampling means to generate a stream of digital data signals alternately proportional to the amount of light from each light source.

2. A barcode reader as claimed in claim 1, wherein the photodetector device includes first and second photodiodes that are connected in parallel to generate a single output signal.

3. A barcode reader capable of reading first and second bar codes, comprising: a first pair of light sources and a second pair of light sources positioned relative to the first and second bar codes, respectively; a first photodetector that generates an output signal proportional to the amount of light directed through the first bar code to the first photodetector from the first pair of light sources; a second photodetector that generates an output signal proportional to the amount of light directed through the second bar code to the second photodetector from the second pair of light sources; means for sampling the output signal generated by the first photodetector and the output signal generated by the second photodetector to produce corresponding digital sample signals; and control means for selectively controlling the operation of the first and second pair of light sources.

4. A barcode reader as claimed in claim 3, wherein the sampling means includes a multiplexer having first and second inputs respectively coupled to the first and second photodetectors and an output coupled to an analog-to-digital converter, and wherein the control means controls the operation of the multiplexer to selectively supply the output signals from the first and second photodetectors to the analog-to-digital converter.

5. A barcode reader as claimed in claim 3, wherein the sampling means includes an analog-to-digital converter having an input coupled to outputs of both the first and second photodetectors and wherein the control means alternates the activation of the first and second pair of light sources.

6. A barcode reader as claimed in claim 3, wherein the first and second photodetectors each include first and second photodiodes connected in parallel to produce an output signal.

7. A method of reading bar code data from a dual track bar code including a clock track and a data track, said method comprising the steps of: activating a first light source to illuminate a clock track portion of the bar code; generating a first signal representative of the amount of light that is either transmitted or reflected by the clock track portion of the bar code to a photodetector; converting the first signal into digital sample data with an analog-to-digital converter; deactivating the first light source and activating a second light source to illuminate a data track portion of the bar code; generating a second signal representative of the amount of light that is either transmitted or reflected by the data track portion of the bar code to the photodetector; and converting the second signal into digital sample data with the analog-to-digital converter.

8. A method of reading bar code data as claimed in claim 7, further comprising the step of obtaining a dark reading by sampling the output of the photodetector with the analog-to-digital converter when the first and second light sources are deactivated.

9. A method of reading bar code data as claimed in claim 8, further comprising the step of subtracting the dark reading from the digital sample data generated from the first and second signals.

* * * * *